WENDELL B. SANDER
RAYMOND VAN DEN HEUVEL
INVENTOR.

BY R. E. Geauque
ATTORNEY

WENDELL B. SANDER
RAYMOND VANDEN HEUVEL
INVENTOR.

BY R. E. Geauque
ATTORNEY

Fig. 6
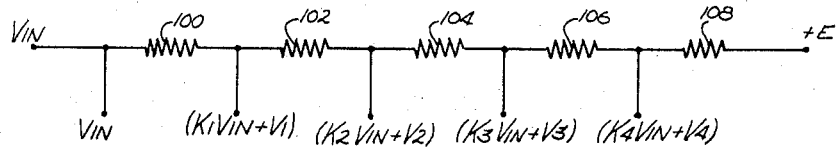
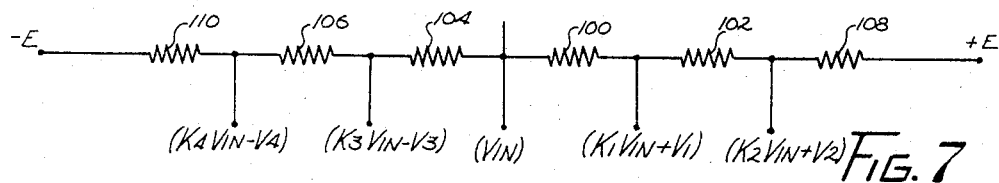
Fig. 7
Fig. 8
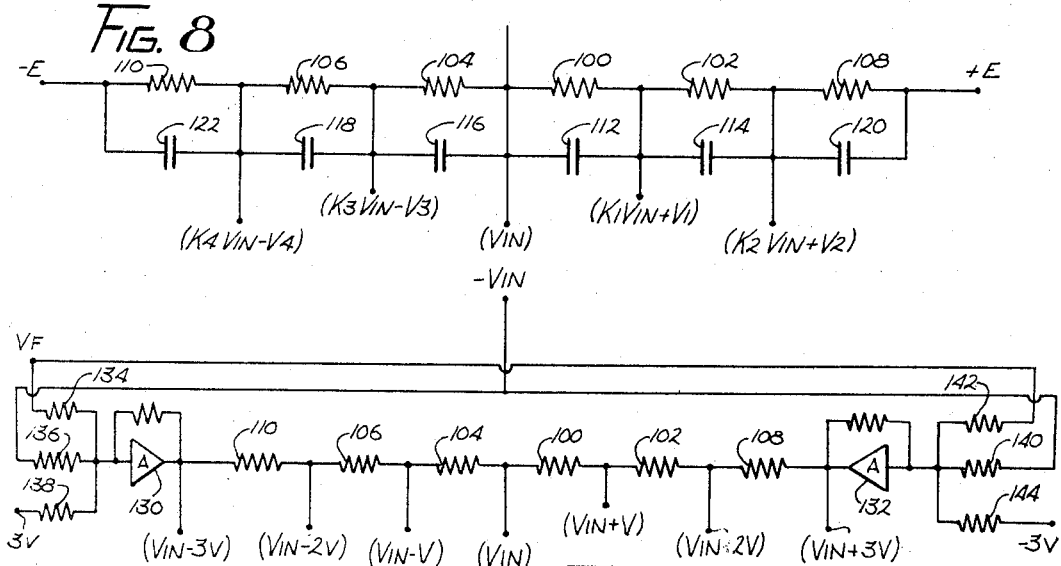
Fig. 9
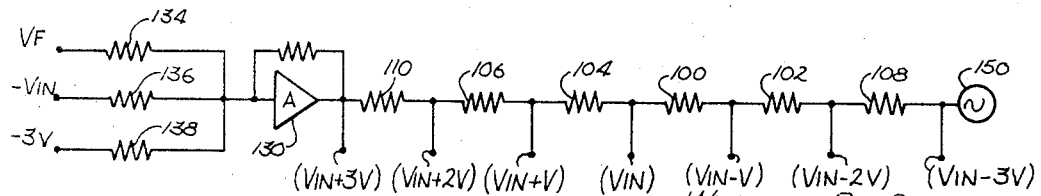
Fig. 10
WENDELL B. SANDER
RAYMOND VANDEN HEUVEL
INVENTOR.
BY R.E. Geauque
ATTORNEY

WENDELL B. SANDER
RAYMOND VAN DEN HEUVEL
INVENTOR.

BY R. E. Geangue
ATTORNEY

United States Patent Office 3,440,639
Patented Apr. 22, 1969

3,440,639
CHARACTER AND SYMBOL GENERATOR WITH RAMP VOLTAGE INPUT
Wendell B. Sander, Palo Alto, and Raymond Van den Heuvel, Los Angeles, Calif., assignors to Tasker Instruments Corporation, Van Nuys, Calif., a corporation of California
Filed Dec. 30, 1966, Ser. No. 606,095
Int. Cl. G08b 23/00
U.S. Cl. 340—324                             15 Claims

ABSTRACT OF THE DISCLOSURE

An electronic symbol generator for a CRT in which a single ramp voltage is divided into a plurality of secondary ramp voltages which are displaced in time and whose slopes equal the slope of the first ramp voltage. The secondary ramp voltages are selectively altered as to slope by character symbol and gating circuitry in response to a character selection input. The altered secondary ramps are then summed to provide composite signals to generate a symbol on a CRT.

---

This invention relates to electronic symbol and character generators, and, more particularly, such generators for generating symbols and characters on the face of a cathode ray tube from a plurality of straight lines having various slopes.

In present day data processing applications, means for displaying characters and symbols visually on, for example, a cathode ray tube, have become increasingly important. One of the better known methods is to illuminate various ones of a plurality of spots arranged in a matrix. Such a matrix may comprise, for example, 35 possible spots, various ones of which are illuminated to form a character or symbol, the 35 spots being arranged in a 5 x 7 matrix. This obviously provides discontinuities, and does not provide a smooth, easily readable character or symbol.

In addition, such prior art systems have embodied unwanted "side effects," such as non-uniform brightness, spot defocussing, transient problems, and extremely wide bandwidth requirements.

Other systems involving continuous line drawing have been suggested, but these have involved complicated switching circuits to change the slope of a line, or have limited the number of various slopes that a line can have. The present invention obviates these problems and provides a character and symbol generator in which characters and symbols are composed of straight lines drawn on the face of a cathode ray tube (CRT) with any desired slope and length to form continuous and very legible characters and/or symbols.

The generator of the present invention requires no internal clocks, no tuned circuits and no critical time constants. Deflection waveforms are generated by a smooth continuous process. There is no limit to the number of segments for a particular generator. The speed of character generation is governed by the rate of growth of one or more simple, linearly-varying ramp voltages, which may increase either positively or negatively. Transition points are not limited to the intersections of a grid pattern (matrix); blanking and unblanking signals are conventional binary signals that turn on and turn off the cathode ray tube beam.

In general terms, the character and symbol generator of the invention utilizes a linear ramp generator to provide a basic character or symbol forming signal. The basic ramp signal is then converted into a plurality of ramp signals by ramp separation networks, whos outputs are ramp signals having the same slopes but being displaced from one another in time. Appropriate ones of the ramp signals from the separation networks are provided to character-symbol and gating circuits, which vary the slopes of the ramp signals as desired to generate a particular character or symbol. The outputs of each character-symbol and gating circuit are then summed to provide composite signals to drive a cathode ray tube and cause to to generate a visible character or symbol on its viewing surface.

External to the character and symbol generator, various control circuits are provided. A display control circuit provides a signal to the basic ramp generator to start generation of the ramp, and character selection circuitry controls the time of energization of the various character-symbol and gating circuits. Of course, the cathode ray tube is provided with signals to initially position its beam for the start of generation of a symbol or character.

The invention will be better understood from the following description taken in conjunction with the accompanying drawings, in which.

Figure 2A:
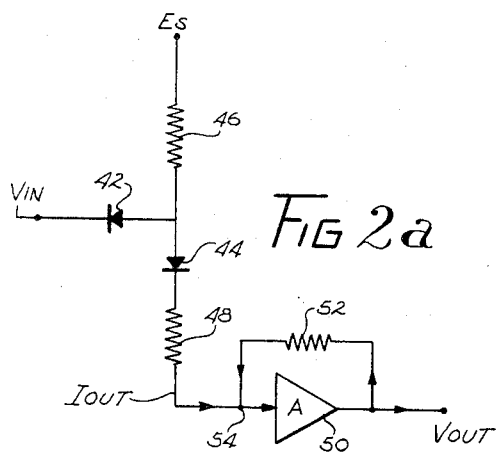
FIGURE 2(a) is a diagram illustrating a basic character-symbol and gating circuit and a summing circuit on which a portion of the invention is based.
Figure 2B:
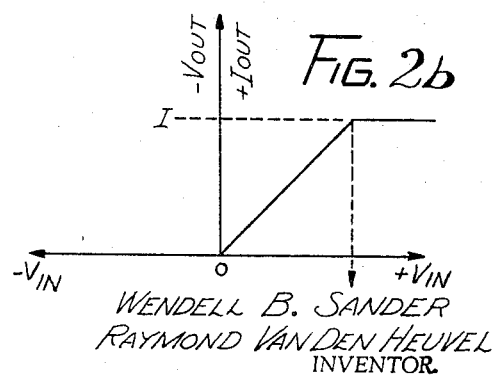
FIGURE 2(b) is a waveform showing the output of the circuit shown in FIGURE 1(a)
Figure 3A:
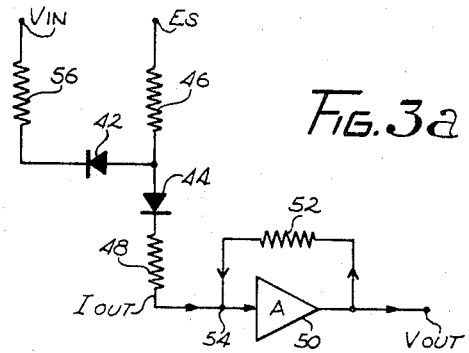
Figure 3B:
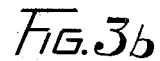
Figure 4A:
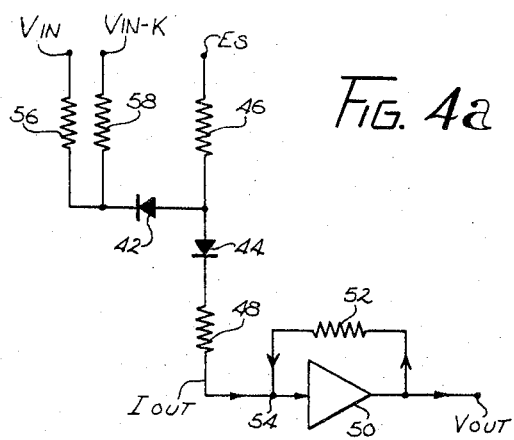
Figure 4B:
Figure 5A:
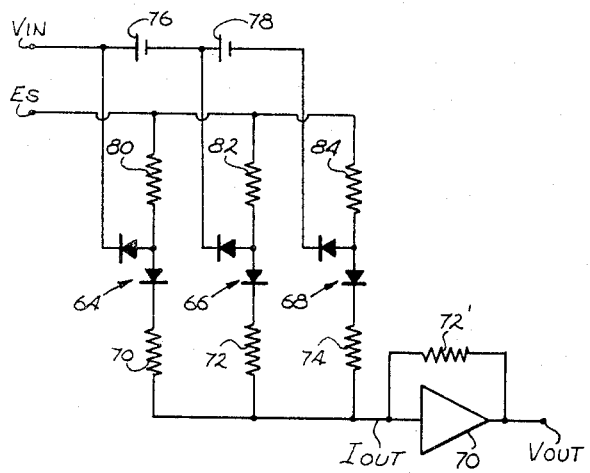
Figure 5B:
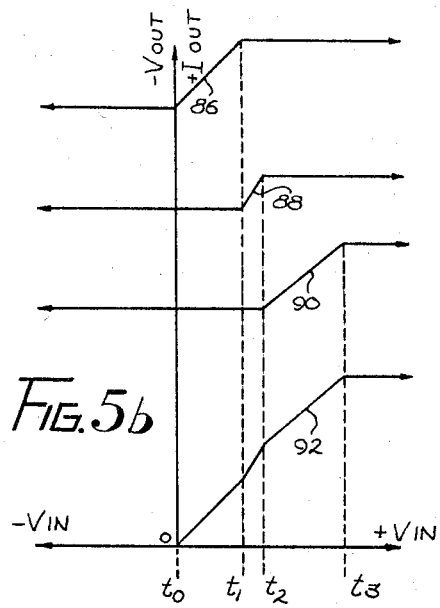
Figure 11:
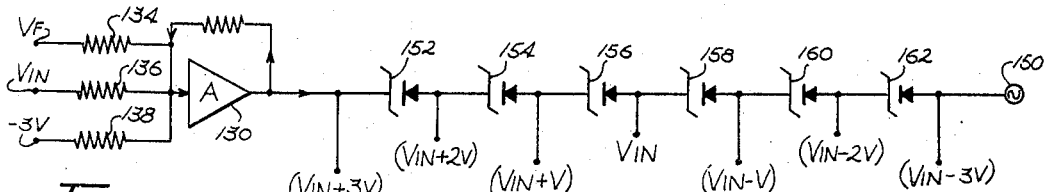
Figure 12:
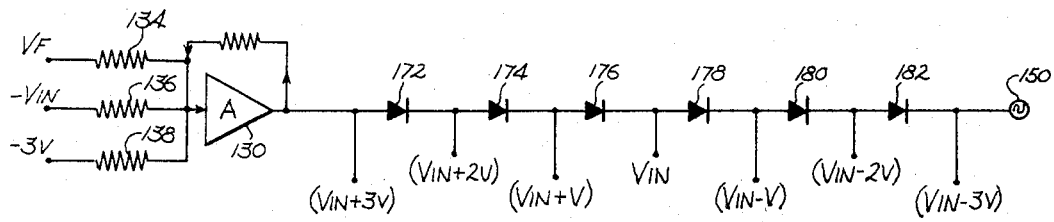
Figure 13:
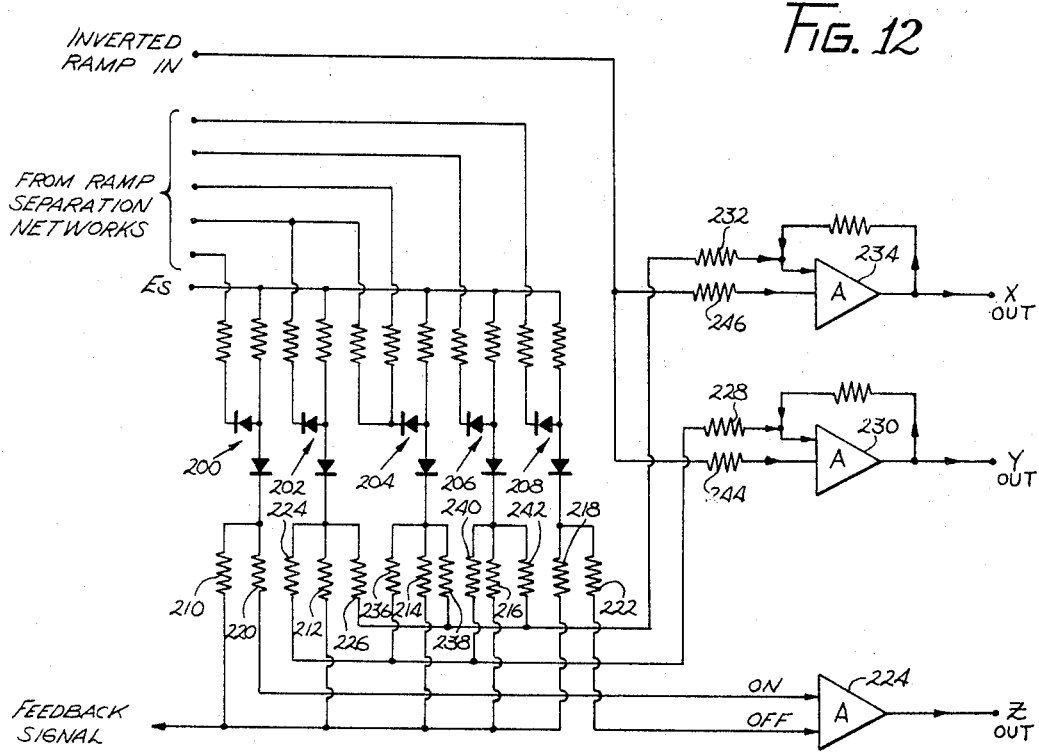

FIGURES 3(a) and 3(b) are similar to FIGURES 2(a) and 2(b), respectively, showing a modified character-symbol and gating circuit and summing circuit and its output waveform;

FIGURES 4(a) and 4(b) are also similar to FIGURES 2(a) and 2(B), respectively, but showing another modified character-symbol and gating circuit and summing circuit and its output waveform;

FIGURE 5(a) is a diagram showing a combination of three character-symbol gating and summing circuits;

FIGURE 5(b) is a waveform diagram showing the outputs of the circuits shown in FIGURE 5(a) and their combined output;

FIGURES 6, 7, 8, 9, 10, 11 and 12 are diagrams of various forms of ramp separation networks that may be embodied in the generator of the invention; and FIGURE 13 is a circuit diagram of a typical character or symbol generator circuit.

As previously noted, the generator of the present invention may be utilized for generating characters, symbols, graphs, line drawings, etc. on the face of a cathode ray tube (CRT), so long as the generated display is made up of straight line segments. Hereinafter, regardless of the particular configuration of the display generated, the generator of the invention will be referred to as a character generator for the sake of simplicity of terminology.

Figure 1:
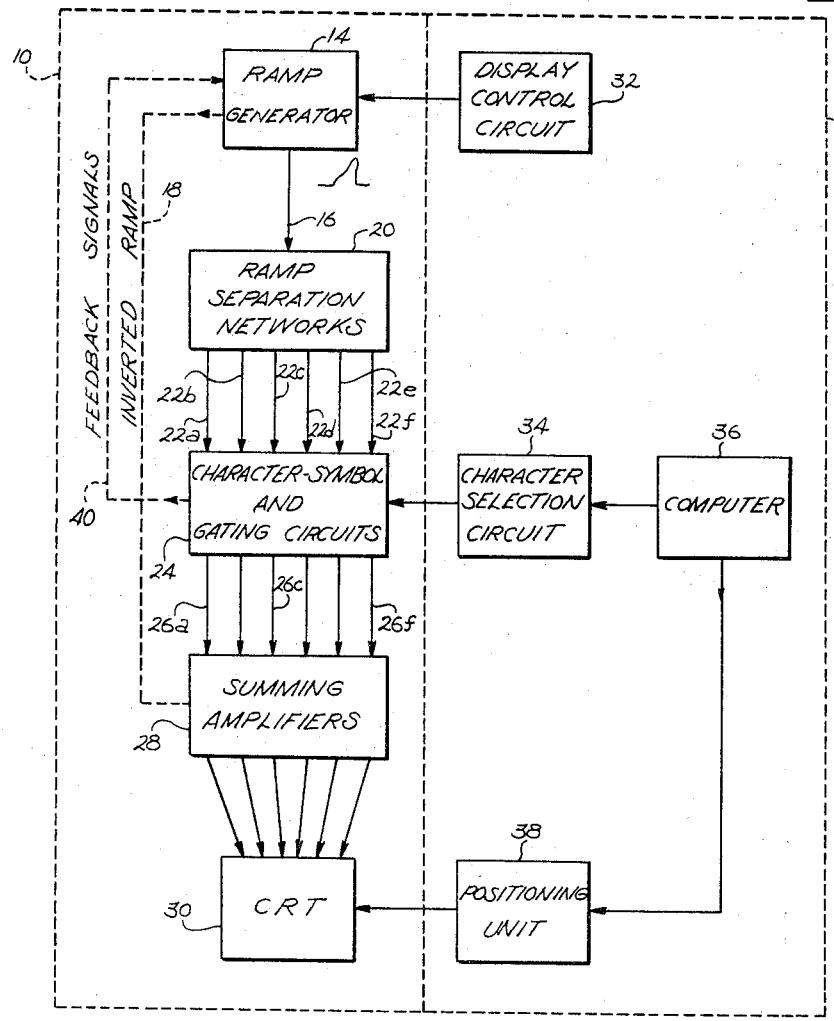
FIGURE 1 is a generalized block diagram of a character and symbol generator embodying the invention.

FIGURE 1 is a block diagram, in quite generalized form, of a character generator embodying the invention. A character generator 10 is provided with external control circuitry 12, which controls the various circuits comprising the generator 10. The control circuitry per se is well known in the art and forms no particular part of the present invention. Therefore, it will be described only in such functional terms as are necessary to understand the operation of the character generator.

As shown in FIGURE 1, a basic linear ramp signal having a predetermined slope is produced by a ramp signal generator 14 and is provided on a line 16; an inverted ramp signal may also be provided on a line 18 if desired. The basic ramp signal is supplied on the line 16 to one or more ramp separation networks 20, which provide a plurality of secondary ramp output signals on lines 22a–22f. The signals appearing on the lines 22a–22f are replicas of the basic ramp signal supplied on the line 16, but are displaced from one another in time; in other words, the various ramp signals appearing on the lines 22a–22f cross a zero-voltage reference line at various times, although they all have the same slope.

The ramp signals appearing on the lines 22a–22f are selectively supplied to a plurality of character-symbol and gating circuits 24. The circuits 24 serve to vary the lengths and slopes of the various ramp signals supplied thereto on the lines 22a–22f to provide straight line segments that can be summed to form various selected characters and symbols. A separate character-symbol and gating circuit is provided for each character and symbol to be generated. The output signals from the circuits 24 are supplied on lines 26a–26f to summing amplifiers 28, one summing amplifier being provided for each X and Y deflection signal output from a gating circuit, as will be later shown in detail. The outputs of the summing amplifiers 28 are provided to deflection circuits of a CRT 30, the cathode ray gun of which traces the desired symbol or character on the CRT display surface.

The external control circuitry 12 comprises a display control circuit 32 that controls the start of generation of the basic ramp signal by the ramp generator 14. The particular character or symbol to be generated is controlled by a character selection circuit 34 that sequentially activates individual circuits of the character-symbol circuits and gating circuits 24. The character selection circuit may, in turn, be controlled by a conventional computer 36. The fundamental or reference position on the face of the CRT at which the start of generation of each character or symbol occurs is controlled by a positioning unit 38 of conventional design and function, also controlled by the computer 36. It is noted that feedback signals may be provided, if desired, on a line 40 from the character-symbol circuits and gating circuits 24 to the basic ramp generator 14 to maintain its output linear.

FIGURE 2(a) illustrates a basic character-symbol and gating circuit and summing circuit that is utilized in a portion of the character generator of the invention. As shown, the circuit comprises a pair of diodes 42 and 44 having their anodes connected together, and through a resistor 46 to a reference voltage $E_S$ provided from the selection circuit 34 of FIGURE 1. The cathode of the diode 42 is connected to a ramp voltage input source $V_{IN}$, and the cathode of the diode 44 is connected to one end of a summing resistor 48, whose other end is connected to the input of a high-gain, inverting amplifier 50. The amplifier 50 is provided with a tight resistive feedback loop between its input and output through a resistor 52, and a virtual ground appears at a summing node 54 in the input to the amplifier 50. This prevents undesirable reactions between various inputs to the amplifier 50 and the true algebraic sum of the currents flowing into the summing node 54 will appear at the output of the amplifier 50 as an output voltage $V_{OUT}$ proportional to the input voltages but of opposite polarity.

When the reference $E_S$ is positive, current flows through the resistor 46 and the diode 42 toward $V_{IN}$, or through the diode 44 and resistor 48, or in both paths. When $E_S$ is negative, conduction through the diodes does not occur. The ramp input voltage $V_{IN}$ is coupled to the summing resistor 48 and causes a decrease in the voltage drop thereacross only when both diodes 42 and 44 are conducting. This simultaneous conduction of the diodes 42 and 44 occurs only when $V_{IN}$ lies between zero and a voltage V, when decreasing conduction of the diode 42 causes decreasing voltage drop across the summing resistor 48 and resistor 46. The value of V depends on the relative values of the resistors 46 and 48.

As seen in FIGURES 2(a), for negative values of $V_{IN}$ there is no output from the summing amplifier 50. However, when $V_{IN}$ crosses zero and increases to the value V, the output current $I_{OUT}$ increases proportionally until it reaches a maximum value I, which remains constant for all values of $V_{IN}$ more positive than V. Thus, by varying the value of V, the voltage level at which the output of the summing amplifier 50 levels off to a constant value can be controlled.

Recapitulating briefly, it is pointed out that the circuit shown in FIGURE 2(a) is thus capable of generating an elementary waveform, which consists of a simple ramp function when the input voltage $V_{IN}$ increases linearly. The rate of increase of the output function (slope), as well as its total increment before leveling off, are both controllable by the values assigned to the resistors 46 and 48. The starting rise point of the output waveform occurs when the value of $V_{IN}$ crosses zero in a positive direction, and thus the entire output waveform can be shifted in time according to when the value of $V_{IN}$ crosses zero.

FIGURE 3(a) illustrates a modified circuit in which $V_{IN}$ is provided to the cathode of the diode 42 through a resistor 56. The addition of the resistor 56 to the circuit shown in FIGURE 2(a) has the effect of modifying the output current waveform so that it starts increasing earlier in time than in the circuit of FIGURE 2(a). In other words, the output current will start increasing while $V_{IN}$ is still negative. This effect is shown clearly in FIGURE 3(b).

FIGURE 4(a) illustrates a further modification of the basic circuit shown in FIGURE 2(a). As shown in FIGURE 4(a), a second resistor 58 has been inserted between the cathode of the diode 42 and a source of voltage $(V_{IN}-K)$, where K is a constant voltage. This configuration is useful when it is desired to have the output waveform both increase and level off for negative values of $V_{IN}$. In FIGURE 4(b), the broken line waveform 60 represents the output without the resistor 58 (as in FIGURE 3(a)), and the solid line waveform 62 represents the output with the resistor 58 and input $(V_{IN}-K)$, as in FIGURE 4(a).

The basic concept of combining character-symbol and gating circuits to provide a function generator that is adaptable to character generation is shown in FIGURE 5(a). As shown in that figure, three basic character-symbol and gating circuits, indicated generally by the numerals 64, 66 and 68, are provided, whose outputs are supplied to a summing amplifier 70 provided with a feedback resistor 72. The circuits 64, 66 and 68 provide ramp output signals across summing resistors 70, 72 and 74, respectively, which signals differ from each other in slope and in time of start. The time of start of each ramp is governed by a biasing circuit, symbolized in FIGURES 5(a) by batteries 76 and 78, each of which represents the resistor 56 or the resistors 56 and 58 shown in FIGURES 3 (a) and 4(a). The slopes of the output signals are controlled by the relative values of the summing resistors 70, 72 and 74, respectively, as previously discussed.

The input voltage $V_{IN}$ is supplied directly to the circuit 64 without a biasing or offset voltage being algebraically added thereto. Therefore, the ramp output signal appearing across the resistor 70 starts at time $t_0$ and increases linearly until time $t_1$, as shown by waveform 86 in FIGURE 5(b). The biasing source 76 causes the output voltage appearing across the resistor 72 of the circuit 66 to start at a later time than that across the resistor 70, and the relative values of the resistors 72 and 82 are adjusted so that the output voltage slope is greater than that from the circuit 64. As represented by waveform 88 in FIGURE 5(b), the ramp output from the circuit 66 starts at time $t_1$ and levels off at time $t_2$. Similarly, the biasing sources 76 and 78 cause the output from the circuit 68 to start at a still later time than that when the outputs from the circuits 64 and 66 start. As shown by waveform 90, the output across the resistor 74 starts at time $t_2$ and levels off at time $t_3$. The slope of the curve 90 depends, of course, on the relative values of the resistors 74 and 84. The various output voltages appearing across the summing resistors 70, 72 and 74 are applied to the input of the summing amplifier 70, which provides an inverted summation voltage $V_{OUT}$ represented by waveform 92 in FIGURE 5(b). Obviously, various numbers of gating circuits providing output voltages of different slopes and different time of starting and stopping may be combined to give a desired output signal from the summing amplifier 70.

FIGURES 6 through 12 illustrate various forms of ramp separation networks, which may be used to provide ramp signals that are offset from one another in time as previously described. For example, three suitable output voltages of one of the separation networks would be used to supply signals to the gates 64, 66 and 68 shown in FIGURE 5(a), thus eliminating the biasing sources 76 and 78.

FIGURE 6 shows the simplest form of network. It consists of a plurality of resistors 100, 102, 104, 106 and 108 connected in series between the driving source of ramp input $V_{IN}$ and a positive reference voltage $+E$. Four output taps are provided between the five resistors 100–108 and, of course, one output is connected directly to $V_{IN}$. As seen in FIGURE 6 from left to right, the output ramp voltages are $V_{IN}$, $(K_1 V_{IN} + V_1)$, $(K_2 V_{IN} + V_2)$, $(K_3 V_{IN} + V_3)$ and $(K_4 V_{IN} + V_4)$. $K_1$, $K_2$, $K_3$ and $K_4$ are attenuation constants, and $V_1$, $V_2$, $V_3$ and $V_4$ represent the shift in output voltages with respect to the ramp input voltage due to the resistors 100, 102, 104 and 106, respectively. These various output voltages, or selected ones of them, are supplied to the character-symbol circuits and gating circuits previously described.

FIGURE 7 shows another ramp separation circuit, which virtually doubles the useful range of driving voltage over that circuit shown in FIGURE 6. The circuit there shown provides a double separation network, in which one side is connected between the driving ramp input voltage $V_{IN}$ and a negative direct current reference voltage $-E$, and the other side is connected between the input voltage $V_{IN}$ and a positive direct current reference voltage $+E$. The number of resistors is increased from five to six, a resistor 110 being added adjacent the reference source $-E$. Also, because the network is fed from its center, the resistors 100–108 have been rearranged. As shown in FIGURE 7 from left to right, the output voltages available are $(K_4 V_{IN} - V_4)$, $(K_3 V_{IN} - V_3)$, $V_{IN}$, $(K_1 V_{IN} + V_1)$ and $(K_2 V_{IN} + V_2)$, where $K_1$, $K_2$, $K_3$, $K_4$ and $V_1$, $V_2$, $V_3$ and $V_4$ have the same values as in the circuit shown in FIGURE 6.

The separation circuit shown in FIGURE 8 is similar to that shown in FIGURE 7 in that it is a double-ended network fed at its center point by the ramp input voltage $V_{IN}$. However, it differs from the circuit of FIGURE 7 in that frequency compensation is provided by a plurality of capacitors connected in parallel with the various resistors. As shown, the resistors 100, 102, 104, 106, 108 and 110 have capacitors 112, 114, 116, 118, 120 and 122, respectively, connected thereacross to provide frequency compensation. It is pointed out that the impedances of the capacitors must be substantially proportional to the resistances of the resistors across which they are connected to provide the desired compensation.

Although the ramp separation networks shown in FIGURES 6, 7 and 8 are generally satisfactory, they do have several drawbacks in that they are attenuating and are somewhat complex to handle analytically. On the other hand, FIGURES 9, 10, 11 and 12 illustrate non-attenuating ramp separation networks that require less input ramp driving signal power than attenuating networks, and are considerably less critical in their parameters.

FIGURE 9 illustrates a non-attenuating separation network utilizing the same resistors 100–110 used in the networks of FIGURES 7 and 8. However, in contrast to the networks previously shown, the network of FIGURE 9 is driven from both ends and is provided with a feedback signal input. The circuit is provided at one end with a summing amplifier 130, which inverts input signals applied thereto and in turn sums them and supplies their sum to the string of resistors. A similar inverting, summing amplifier 132 supplies signals to the other end of the network.

Input to the amplifier 130 is from three summing resistors 134, 136 and 138. The input from the resistor 134 is optional and is a feedback signal $V_F$ that may be supplied from the character-symbol circuits and gating circuits 24 shown in FIGURE 1. The signal supplied by the resistor 136 is the ramp input driving signal, which, because the amplifier 130 inverts, is supplied as a negative ramp signal $-V_{IN}$. The third input signal is a reference voltage of a desired value such as $+3$ v. applied to the resistor 138. Similarly, the ramp input signal $-V_{IN}$ is supplied through a resistor 140 to the input of the amplifier 132, and the feedback signal $V_F$ is supplied to that amplifier through a resistor 142. A third input signal to the amplifier 132 is a reference voltage of a desired value such as $-3$ v. supplied through a resistor 144. As shown in FIGURE 9 from left to right, seven outputs are provided. Because of the inversion by the amplifier 130, the output signals to the left of the center of the network are $(V_{IN} - 3V)$, $(V_{IN} - 2V)$ and $(V_{IN} - V)$. The output at the center point is, of course, $V_{IN}$. To the right of the center point the output voltages are $(V_{IN} + V)$, $(V_{IN} + 2V)$ and $(V_{IN} + 3V)$. In the foregoing example, it is assumed that all of the resistors 100–110 are of equal value; they may, of course, be of different values if desired to produce output signals of various values.

The network shown in FIGURE 10 is essentially like that shown in FIGURE 9, except that the amplifier 132 has been replaced by a constant current source 150, and the reference voltage supplied to the resistor 138 is $-3$ v. rather than $+3$ v. Thus, from left to right as seen in FIGURE 10, the output voltages range from $(V_{IN} + 3V)$ to $(V_{IN} - 3V)$.

FIGURES 11 and 12 illustrate ramp separation circuits utilizing diodes rather than resistors. FIGURE 11 shows a circuit embodying six Zener diodes 152–162 connected in series between the amplifier 130 and the constant current source 150. Here, of course, the Zener diodes are connected with polarities in opposition to the normal flow of current from the amplifier-voltage source 130 to the constant current generator 150. As the Zener diodes break down and conduct current in a reverse direction, there is a virtually constant voltage drop across each diode that approximates closely the bias voltage that might be provided by a battery.

FIGURE 12 illustrates a circuit that is very similar to that of FIGURE 11, except that the Zener diodes 152–162 have been replaced by conventional diodes 172–182 connected with polarities in the direction of normal current flow, so that current flows from the amplifier 130 to the constant current generator 150. The various output voltages obtainable from the circuits of FIGURES 11 and 12 are essentially the same, and range from $(V_{IN} + 3V)$ to $(V_{IN} - 3V)$.

The very low dynamics impedances of Zener and regular diodes as used in the circuits of FIGURES 11 and 12 provide a major advantage. Also, the relatively high capacitances associated with the two types of diodes definitely contributes to frequency compensation, much in the manner of the shunt capacitors shown in the circuit of FIGURE 8.

FIGURE 13 shows a typical set of character-symbol circuits, gating circuits and summing amplifiers used to generate one character or symbol. It is pointed out that a circuit similar to that shown in FIGURE 13 is utilized to generate each different character and symbol under the control of the computer and character selection circuits shown in FIGURE 1.

The somewhat elementary circuit shown in FIGURE 13 comprises five character-symbol and gating circuits, designated generally by the numerals 200, 202, 204, 206 and 208, each of which comprises a pair of diodes as shown in previously described figures. The inputs to the diodes of each gate are from the reference voltage source of $E_S$ and from various outputs of one or more ramp separation networks, such as those shown in FIGURES 6–12. The gates 200, 202, 204, 206 and 208 are respectively provided with summing resistors 210, 212, 214, 216 and 218 that provide a feedback signal to the ramp separation network.

The gates 200 and 208 provide "ON" and "OFF" signals, respectively, through summing resistors 220 and 222 to a high-gain amplifier 224. The output of the amplifier 224 is supplied to the intensity control of the CRT to turn the cathode ray beam on and off at appropriate times.

The gate 202 is provided with a pair of summing resistors 224 and 226, the resistor 224 being connected to another summing resistor 228 in the input circuit to an amplifier 230, and the resistor 226 being connected to a summing resistor 232 in the input to an amplifier 234. The output of the amplifier 230 is provided to the Y or vertical deflection mechanism of the CRT, and the output of the ampliefir 234 is provided to the X or horizontal deflection circuitry of the CRT. The gate 204 is similarly provided with summing resistors 236 and 238 which are respectively connected to the resistors 228 and 232. Likewise, the gate 206 is provided with summing resistors 240 and 242 that are respectively connected to the amplifier input resistors 228 and 232.

An inverted ramp signal is also provided to the summing amplifiers 230 and 234 through resistors 244 and 246, respectively, which provides additional latitude to the generator.

In the partciular example illustrated in FIGURE 13, the generated waveform will include at least three ramps of varying slopes and total increments. It is, of course, understood that in a practical embodiment of the character generator of the invention any number of gates may be used as required to generate a desired character or symbol. In such a generator, whenever two successive ramps fail to intersect they are joined by a non-varying function. In the case of overlap of two successive ramps, a third ramp is generated in the region of overlap whose slope is equal to the sum of the slopes of the overlapping ramps. Usually, however, the generator is so designed that one ramp starts at the point where a preceding ramp levels off, unless a vertical or horizontal output is desired in a particular interval.

What is claimed is:

1. A character-symbol generator comprising:
   a ramp signal generator for producing a ramp voltage signal having a predetermined slope;
   at least one ramp separation network connected to receive said ramp voltage signal for producing a plurality of secondary ramp signals having the same slope as said ramp voltage signal, but crossing a zero-voltage reference line at different times;
   at least one character-symbol and gating circuit connected to receive at least a portion of said secondary ramp signals;
   said character-symbol and gating circuit providing output ramp signals varying in slope and time duration one from another; and
   means for summing said output ramp signals from said character-symbol and gating circuit to provide a character-symbol representing signal.

2. The generator defined by claim 1, further including display means for utilizing said character-symbol representing symbol.

3. The generator defined by claim 1, wherein said character-symbol and gating circuit comprises a first and a second diode, each diode having an anode and a cathode, the anodes of said diodes being connected together and connected to a source of reference voltage through a first resistor, the cathode of said first diode being connected to receive one of said secondary ramp signals, and the cathode of said second diode being connected to a summing resistor.

4. The generator defined by claim 3, wherein the cathode of said first diode is connected to receive said ramp voltage signal through a third resistor.

5. The generator defined by claim 3, further including a summing amplifier connected to said summing resistor.

6. The generator defined by claim 1, including a plurality of character-symbol and gating circuits, each comprising a first and a second diode, each diode having an anode and a cathode, the anodes of said diodes being connected together and connected to a source of reference voltage through a first resistor, the cathode of said first diode being connected to receive one of said secondary ramp signals, and the cathode of said second diode being connected to a summing resistor.

7. The generator defined by claim 6, further including a summing amplifier connected to all said summing resistors of said character-symbol and gating circuits.

8. The generator defined by claim 1, including a plurality of character-symbol and gating circuits, each comprising a first and a second diode, each diode having an anode and a cathode, the anodes of said diodes being connected together and connected to a source of reference voltage through a first resistor, the cathode of said first diode being connected to receive one of said secondary ramp signals, and the cathode of said second diode being connected to a plurality of summing resistors.

9. The generator defined by claim 8, further including a plurality of summing amplifiers selectively connected to various ones of said summing resistors of said character-symbol and gating circuits.

10. The generator defined by claim 1, wherein said ramp separation network comprises a plurality of impedances connected in series to receive said ramp voltage signal.

11. The generator defined by claim 1, wherein said ramp separation network comprises a plurality of impedances connected in series to receive said ramp voltage signal at one end of said series.

12. The generator defined by claim 1, wherein said ramp separation network comprises a plurality of impedances connected in series between two reference voltages and receiving said ramp voltage signal substantially at a center point of said series.

13. The generator defined by claim 10, wherein said impedances are resistors.

14. The generator defined by claim 10, wherein said impedances are diodes.

15. The generator defined by claim 10, wherein said impedances are Zener diodes.

References Cited

UNITED STATES PATENTS

| | | |
|---|---|---|
| 3,110,802 | 11/1963 | Ingham et al. |
| 3,165,729 | 1/1965 | Richman. |
| 3,325,802 | 6/1967 | Bacon. |
| 3,329,948 | 7/1967 | Halsted. |
| 3,372,398 | 3/1968 | Narin et al. |

THOMAS B. HABECKER, *Primary Examiner.*

ALAN J. KASPER, *Assistant Examiner.*

U.S. Cl. X.R.

178—7.8; 307—218, 231, 229; 315—18